(12) United States Patent
Garcia et al.

(10) Patent No.: US 6,443,556 B1
(45) Date of Patent: Sep. 3, 2002

(54) AUTOMATED AND SEMIAUTOMATED PRINTMASK GENERATION FOR INCREMENTAL PRINTING

(75) Inventors: Joan Manuel Garcia; Antoni Gil Miquel; Elizabeth Zapata, all of Barcelona (ES); Izhak Baharav, San Jose, CA (US); Doron Shaked, Haifa (IL); Santiago Garcia-Reyero, Barcelona (ES)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/632,197

(22) Filed: Aug. 2, 2000

Related U.S. Application Data
(60) Provisional application No. 60/219,315, filed on Feb. 29, 2000.

(51) Int. Cl.$^7$ .................................................. B41J 2/21
(52) U.S. Cl. ............................ 347/43; 347/19; 347/14
(58) Field of Search .............................. 347/15, 43, 14, 347/19, 5, 9, 12, 40; 358/1.8, 457, 502, 517, 526, 535, 1.9

(56) References Cited

U.S. PATENT DOCUMENTS

| | | | | |
|---|---|---|---|---|
| 5,920,682 A | * | 7/1999 | Shu et al. ................... | 358/456 |
| 6,067,405 A | * | 5/2000 | Serra ........................... | 347/40 |
| 6,238,112 B1 | * | 5/2001 | Girones et al. .............. | 347/43 |

* cited by examiner

Primary Examiner—Lamson D. Nguyen
(74) Attorney, Agent, or Firm—Ashen & Lippman

(57) ABSTRACT

One invention aspect forms a mask and matrix of corresponding backups for values in the mask, checks when a mask value is not working, and replaces only that value with only a matching matrix entry. A second matrix of further backups is best formed. Another aspect forms a mask as a matrix of stacks of matching entries for mask positions; selects an entry for each position from the matching matrix stack; and prints using the selected entry at each position. Another aspect forms a mask as a matrix of stacks of matching entries for mask positions, and rotates each stack to select an entry for each position. Another aspect forms a mask and a matrix of stacks of backups; finds nonworking mask values and replaces such values with backups from a matching stack. Another aspect forms a seminal mask, tiles it to make a larger one with related properties, and injects noise to disrupt tiling-caused regularity and form a less-regular mask.

39 Claims, 10 Drawing Sheets

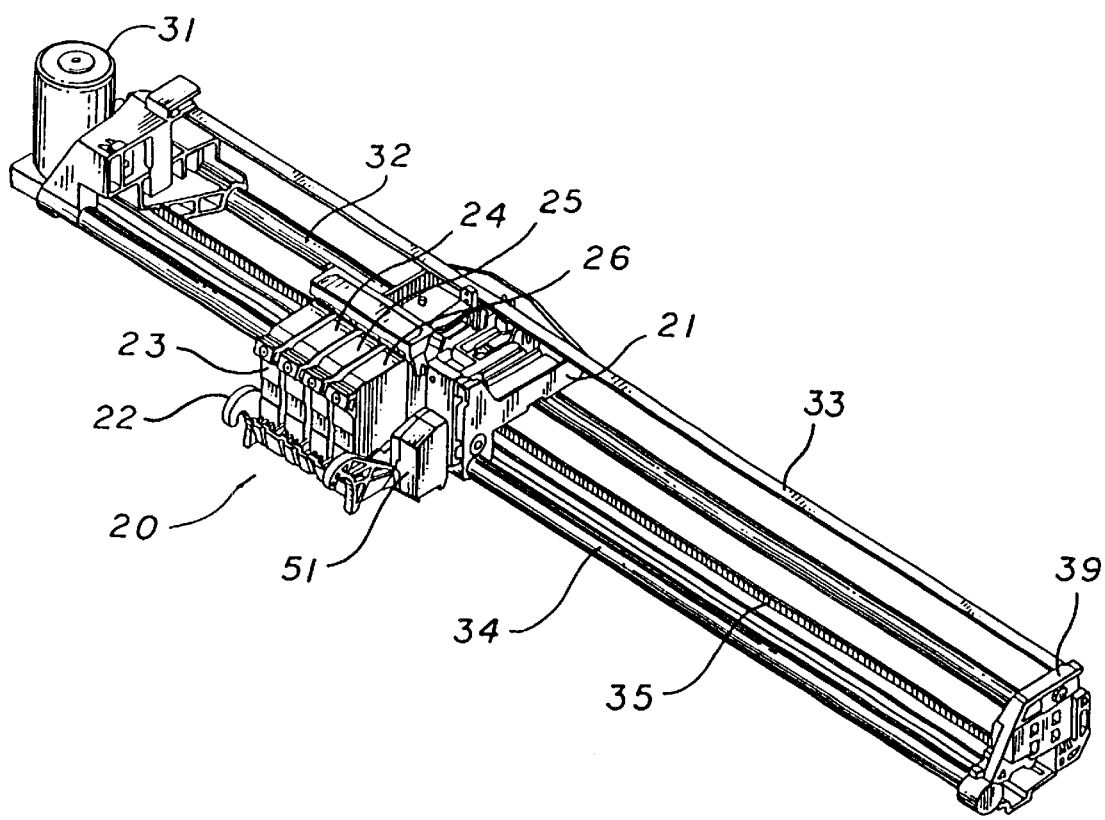

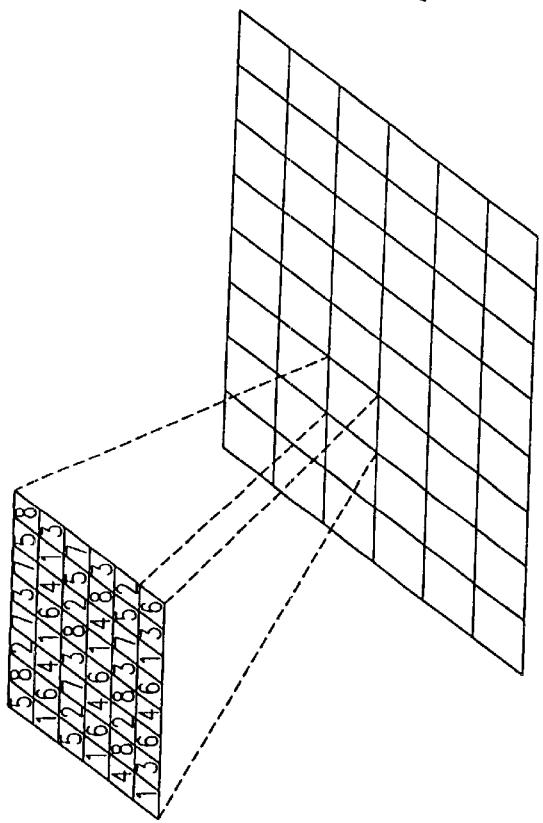

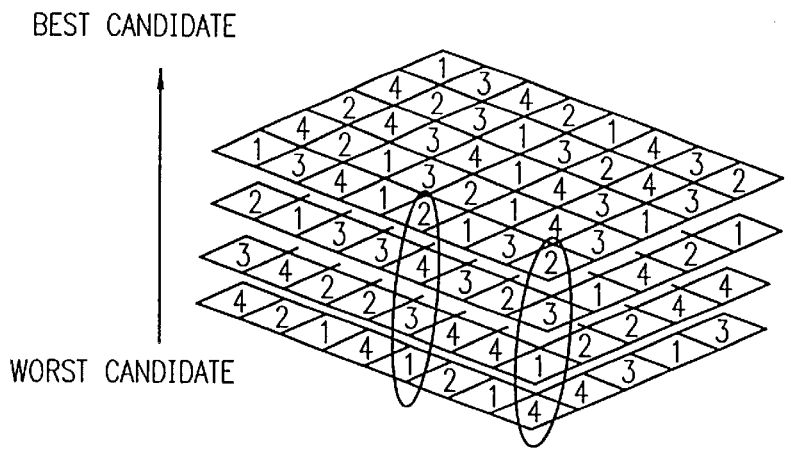
FIG. 8
BEST CANDIDATE
WORST CANDIDATE
FIG. 9
1.) BUILD 1 SINGLE MASK MANUALLY — A
2.) BUILD SIMILAR ONES FOR P PRINTHEADS — $B_1$
3.) REPLICATE TO SIZE — $C_1$
4.) INJECT NOISE
5.) REHEAT — $D_1$
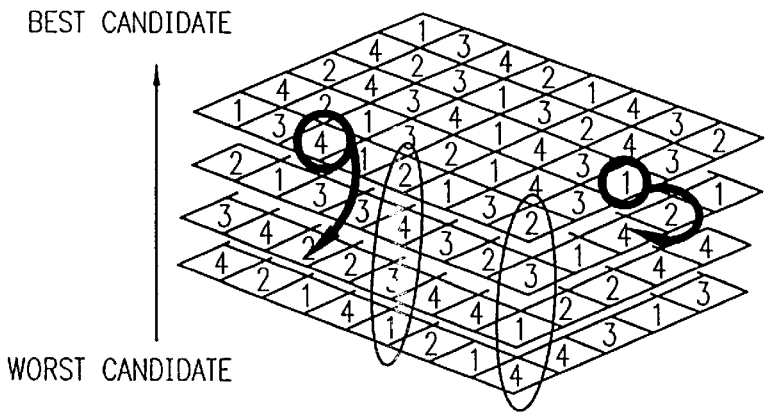
FIG. 10
BEST CANDIDATE
WORST CANDIDATE

```
PRINTMODE multicolor_8pass
SWATH FORMATS {
        CMYKcm1200x600
        CMYKcm600_2planes
}
MEDIA SUPPORTED
{
    BOND
    CLEAR_FILM
    VELLUM
    MATTE_FILM
    TRANSLUCENT
    COATED_PAPER
    HEAVYWEIGHT_COATED
    GLOSSY_PAPER
    GLOSSY_FILM
    GLOSSY_PHOTO
    NATURAL_TRACING
    THIN_NATURAL_TRACING
    ON_LINE_COATED
}
QUALITY BEST BEST
BEFORE QUEUEING
{
    columnSplit
        rotate
}
SHAKES 496 512 8 {
        DROPS { 0 1 1 2 }
        RANDOM 200       ; New meaning: it is the noise that we inject
        FREQUENCY 0
        PARITY 10        ; New (pending from FW10)
}

NOZZLES       512 512 512 512 512 512
RESOLUTION    600 600 600 600 600 600
PASS {
        BIDIR ALTERNATE
        SPEED           28.33
        PIX_ADVANCE     16

FIRST_NOZZLE    1
        NOZZLE_NO    1    5    9   488  492  496  ⎫ RAMP
        VALUE      800  900 1000  1000  900  800  ⎬
        GAMMA     1000 2000 -2000 1000 -2000 2000 ⎭ DEFINITION

DOTS_PER_PASS  1 1 1 1 1 1
        PLANE          { 0 1 } { 0 1 } { 0 1 } { 0 1 } { 0 1 } { 0 1 }
}

PASS {
        BIDIR ALTERNATE
        SPEED           28.33
        PIX_ADVANCE     108

FIRST_NOZZLE    17
        NOZZLE_NO   17   22   26   504  508  512
        VALUE      800  900 1000  1000  900  800
        GAMMA     1000 2000 -2000 1000 -2000 2000

DOTS_PER_PASS  1 1 1 1 1 1
        PLANE          { 0 1 } { 0 1 } { 0 1 , { 0 1 } { 0 1 } { 0 1 }
}
```

FIG. 11

AUTOMATED AND SEMIAUTOMATED PRINTMASK GENERATION FOR INCREMENTAL PRINTING

RELATED PATENT DOCUMENTS

This application claims benefit of provisional appln. No. 60/219,315 filed Feb. 29, 2000.

A closely related document is another, coowned U.S. utility-patent application filed in the United States Patent and Trademark Office substantially contemporaneously with this document. It is in the name of Zapata, identified as Hewlett Packard Company and entitled "BANDING REDUCTION IN INCREMENTAL PRINTING, BY SPACING-APART OF SWATH EDGES AND BY RANDOMLY SELECTED PRINT-MEDIUM ADVANCE"— subsequently assigned utility-patent-application Ser. No. 09/516,816. That document, and other related documents cited or discussed in it, are hereby incorporated by reference in their entirety into this document.

Another related document also wholly incorporated by reference herein is another, coowned U.S. utility-patent application filed in the U.S. Patent and Trademark Office generally contemporaneously with this document in the name of Gil, and is pertinent for its introduction of print-mode techniques that promote smoothness of printmasks and consequently of printed images. That document is identified as Hewlett Packard Company entitled "BANDING REDUCTION IN INCREMENTAL PRINTING, THROUGH USE OF COMPLEMENTARY WEIGHTS FOR COMPLEMENTARY PRINTHEAD REGIONS"— and subsequently given application Ser. No. 09/516,323.

FIELD OF THE INVENTION

This invention relates generally to machines and procedures for printing text or graphics on printing media such as paper, transparency stock, or other glossy media; and more particularly to a scanning thermal-inkjet machine and method that construct text or images from individual ink spots created on a printing medium, in a two-dimensional pixel array. The invention employs print-mode techniques to optimize image quality.

BACKGROUND OF THE INVENTION (a) Orientation—Printmasks are used to determine the pass number in which a halftone dot is formed by an inkjet on the paper. Modern inkjet printers have the capability to detect defective nozzles on-line. In order to compensate for the defective nozzle the printmask has to be redesigned, or at least modified.

Currently applied methods either redesign a printmask on-line, or replace the defective nozzle with a predetermined backup nozzle. Those methods compromise the quality of the printmask, either globally (in the former), or locally.

A final stage of the inkjet printing pipeline consists of determining the pass number in which inkdrops allocated by the halftoning stage will be laid on the paper. The goal is, usually, to make sure that neighboring dots are laid as distant on the time axis, as is made possible by the number of passes allocated to the print-mode.

One reason for this time separation is that nearby liquid inkdrops might coalesce, thereby creating pigment density fluctuations on the paper. If, on the other hand, by the time a dot is laid down all its previously laid neighbors are already dry, no coalescence occurs.

The pass-number allocation is technically achieved using an integer matrix of pass numbers, called "printmask," which is placed in a periodically repetitive manner on the halftone pattern (FIG. 4). This way, every halftone location corresponds to a pass number from the printmask. An inkdrop, if allocated by the halftoning stage, is laid down at the corresponding pass number.

Modern inkjet printers have on-line nozzle quality-checking capabilities. Having detected a defective nozzle a printer should relieve that nozzle from part of its duties, or simply stop using it at all.

All this may be done by redesigning or modifying the printmask. For every line in the printmask there is a mapping between pass numbers and nozzles. Thus forbidding a certain nozzle is achieved by prohibiting predetermined pass numbers in certain lines of the printmask.

The problem of compensating for damaged nozzles is thus transformed to a problem of designing new printmasks with the appropriate constraints. Since the number of nozzles is too large to save a different printmask optimized for the possibility that a each different nozzle may be damaged, the design has to be performed on-line on the printer. Factory-created printmask patterns are carefully designed to use the tradeoff between various technical and print-quality requirements, whose optimization of which is too complicated for an on-line routine. Nevertheless, fast alternatives with reasonably good quality have been used.

Three mask creations methods in use are the following.

1. Handmade masks—These allow very good control over placement of each drop, and also help with considering interactions between printheads in an easy way. The main drawback of handmade masks comes from the fact that they are very small, therefore tending when tiled throughout an image to produce banding or regular patterns.

Handmade masks also do not allow good management of nozzle usage. Any error-hiding policy that is attempted here requires some amount of hardcoded mask replacement.

2. Redesign—A new printmask is designed on-line. The time and hardware constraints dictate a suboptimal design, which reduces the overall quality of the printmask. Furthermore, this method is limited to printers with enough computation power to support it, and might require a noticeable time duration to be performed. In this method the burden of the damaged nozzle is partitioned equally between the available nozzles.

3. Backup Nozzle—Every nozzle has a backup nozzle. When a nozzle is damaged, its backup is activated. The printmask does not change, only the mapping between pass numbers and nozzles.

Thus, at the lines where the damaged nozzle was not employed, the print quality is not altered; however, at the damaged-nozzle locations, the application of a backup nozzle results usually in poor quality due to possible breaches of printmask design requirements. In addition, the double duty of the backup nozzle might shorten its life span. This procedure requires no significant computation.

(b) Automated and semiautomated generation of printmasks—Joan Manel Garcia-Reyero, in U.S. utility-patent applications Ser. No. 09/150,321 through '323, has introduced a fundamental advance in printmask generation. His system and method express all needed considerations for use in preparing a mask—and test criteria as well—in a generalized form and accordingly are able to produce at each attempt a usable mask of high quality.

In some circumstances, however, the Garcia approach in its purest form is subject to undesired limitations such as excessive time consumption for use in the field. It is accordingly susceptible to refinement for mitigation of these limitations.

Because Garcia's invention in particular addresses issues of controlling the randomness (or granularity) of printmasks and resulting images, he dubbed it "Shakes". For brevity and convenience, this document too will refer to his invention by that nickname.

Nozzle weighting is a technique first described in Joan Manel Garcia-Reyero's document about Shakes, consisting of specifying a certain percentage of usage per nozzle. That is, a single nozzle will not only be used or not, but the number of times it will appear in a mask description can be specified.

The interesting thing is that this nozzle weighting is also dependent on the printhead status in a given moment. Algorithms to determine this weighting have also been disclosed.

It was later discovered that they could easily support Variable Paper Advance Printmodes, Pass-Dependent Nozzle Weighting and Multilevel Printing. They also provide an easy way to install printmodes into the printer, even through the Internet.

(c) Classical Shakes with Nozzle Weighting—Shakes is a tool that automatically generates fuzzy masks, given a set of rules determined by the engineer that is designing the masks. Therefore, the designer must "explain" to Shakes how he/she wants the mask, and let it do it.

The main advantage is that masks can be generated that are far larger than handmade ones, and noisy enough to build banding robustness. Nozzle weighting is much easier now, but it still requires a significant number of CPU cycles.

On the other hand, if the resulting mask is not good enough for the designer's needs, the "explanation" must be reformulated, which turns into a recursive process. The complexity of the process increases, as more regular masks are sought.

In summary, Shakes is optimal for masks that have a certain degree of randomness (i.e., the fuzzy masks), but there seems to be a discontinuity when trying to move to more regular masks.

The Shakes process allows Nozzle Weighting in two senses. One Nozzle-Weighting process is what is called "List". This was already implemented inside a product (Shakesmall), but there was a very poor correlation between the input weight and the actual nozzle usage.

The other Nozzle-Weighting option offered by Shakes is called "NozzDist". It requires two rounds of calculation for a given mask, the second round being much slower than the first one. This option was discarded for Shakesmall because the throughput hit was unacceptable.

(d) Encad Error Hiding Method Using a Backup Matrix—In this competitive system a different backup nozzle was used for each location. A basic drawback: it was for binary printing (only one drop per pixel) and only supported Error Hiding (a nozzle is either used or not).

A single nozzle, on a binary pipeline (that is, one drop per cell), is replaced (backed-up) by a plurality of nozzles, in such a way that the resulting mask still complies with boundary conditions. The context is twice binary: one single drop per cell, and all-or-none usage for any specific nozzle. (WO 99/08875: Inkjet Printer, Method and System Compensating for Non-Functional Print Elements).

(e) Requirements: multilevel printing; very specific nozzle usage—Masks currently used can handle one or various drops firing onto a single cell. Generally, two drops per 600-dpi cell are fired (this is conveniently called 2 dp6). Therefore two levels of mask are needed to start with, and more than this to handle backup information.

Functionality for hiding a nozzle is not good for a current product. Forbidding use of a nozzle could revert into not completing a mask, when several drops per cell are addressed. Besides, it is desirable to make ramps and print less with those nozzles that don't perform very well (but still print!), or near which an air bubble has been detected.

(f) Conclusion—Thus failure to effectively address the difficult constraints of printmask generation by automated and semiautomated procedures has continued to impede achievement of uniformly excellent inkjet printing. Thus important aspects of the technology used in the field of the invention remain amenable to useful refinement.

SUMMARY OF THE DISCLOSURE

The present invention introduces such refinement. The invention has several independent aspects or facets, certain of which are advantageously practiced together for best overall enjoyment of their benefits. These facets, however, are amenable to practice separately from one another and will accordingly be introduced separately below.

In preferred embodiments of a first of its major independent facets or aspects, the invention is a printmasking method for use in incremental printing. The method includes the step of establishing a printmask.

Another step is establishing a matrix of corresponding backup entries for values in the printmask; and another is determining when an individual value in the printmask is nonfunctional. Yet another step is individually replacing exclusively the individual determined nonfunctional value with exclusively a corresponding individual backup entry from the matrix.

The foregoing may represent a description or definition of the first aspect or facet of the invention in its broadest or most general form. Even as couched in these broad terms, however, it can be seen that this facet of the invention importantly advances the art. In particular, identifying in advance a particular backup entry for each matrix position, respectively, yields a benefit in terms of the ability to now optimize backup conditions.

Although the first major aspect of the invention thus significantly advances the art, nevertheless to optimize enjoyment of its benefits preferably the invention is practiced in conjunction with certain additional features or characteristics. In particular, if the method is for use with multiple printing elements—each printing element being used in multiple locations of the printmask—then preferably the matrix of backup entries provides a location-dependent backup for substantially each printing element. This preference is in effect an example of the above-mentioned opportunity to optimize the backup.

Another preference is that the two establishing steps be both performed offline, before the printer begins to print an image. In this case, preferably these two steps actually are both performed even before the printer is first placed in service.

Considered next are two alternative preferences. One of these is that the matrix-establishing step be substantially concurrent with, and interleaved with, the printmask-establishing step—and that each matrix entry be selected substantially as a best alternative to its corresponding printmask entry. The other alternative preference is that the matrix-establishing step be performed after substantially the entire printmask-establishing step is complete.

Yet another preference is that the method further include the step of establishing a second backup matrix of further backup entries. In this case also the method also includes the step of determining when an individual value in the first-mentioned matrix is nonfunctional.

A third added step, as part of this same preference, is individually replacing exclusively the individual determined nonfunctional value of the first-mentioned matrix with exclusively a corresponding individual backup entry from the second backup matrix. This preference represents in effect a further set of fallback positions in case not only a primary matrix position but also its first line of defense fails.

In preferred embodiments of its second major independent facet or aspect, the invention is a printmasking method for use in incremental printing. The method includes the step of establishing a printmask in the form of a matrix of stacks of corresponding entries for positions in the printmask.

The method also includes the step of individually selecting an entry for substantially each position in the printmask, respectively. This is accomplished by choosing an individual entry from the corresponding stack in the matrix.

Another step is printing an image. This step is performed using the respective individually selected entry at substantially each position in the printmask.

The foregoing may represent a description or definition of the second aspect or facet of the invention in its broadest or most general form. Even as couched in these broad terms, however, it can be seen that this facet of the invention importantly advances the art.

In particular, this generalized formulation establishes the basis of a powerful analytical framework and methodology. This analytical framework is a more highly generalized and robust conceptualization than the above-described first main aspect of the invention, and as will shortly be seen enables in turn the achievement of several useful advances.

Although the second major aspect of the invention thus significantly advances the art, nevertheless to optimize enjoyment of its benefits preferably the invention is practiced in conjunction with certain additional features or characteristics. In particular, preferably the selecting step includes rotating entries in the stack for selection.

In this case, further preferably the selecting step includes (1) associating a respective individual printing element with each entry in each stack; (2) identifying with the associated printing element a respective numerical weight; and (3) applying to each entry in the stack a selection probability related to the identified numerical weight.

Several further preferences are applicable if these last-mentioned three elements are included in the selecting step. One of these is that the numerical weight for each element is influenced by the position of the element in a printing-medium advance sequence, or the number of a pass in which the element is to be fired. Another such preference is that any element initially rejected by virtue of the applied selection probability is shifted to the bottom of the stack in rotation—so that an initially rejected element can later rotate to the top of a stack for reconsideration. Yet a third such preference is that the method further include determining when an individual printing element is nonfunctional, assigning to that element a relatively low numerical weight, and applying to a corresponding value in a printmask stack a relatively low selection probability.

Reverting now to the second main aspect of the invention, another preference based directly on that aspect is that the method further include modifying the printmask to reflect firing-frequency limitations. In this case preferably the firing-frequency limitations carry a higher authority level than the numerical weights; in fact ideally the firing-frequency limitations are substantially absolute.

Still another preference directly based on the second aspect of the invention is that the establishing step take one of three possible forms: generating the mask on the fly for each image, generating the mask at the time of printer initialization, and storing the mask in nonvolatile memory for retrieval whenever needed. In this case, whenever the printer is to print, the mask is preferably generated or retrieved for use and then, before use, is processed by stack rotation at essentially each position.

In preferred embodiments of its third major independent facet or aspect, the invention is apparatus for use in incremental printing of an image. The apparatus includes some means defining a printmask.

For generality and breadth in discussing the invention, these means will be called simply the "defining means". The printmask is defined in the form of a matrix of stacks of corresponding entries for positions in the printmask.

Also included are some means for rotating each stack if desired to individually select an entry for substantially each position in the printmask, respectively. For breadth and generality as before, these means will be called the "rotating means".

The apparatus also includes some means for printing the image using selected entries. These means will be called the "printing means".

The foregoing may represent a description or definition of the third aspect or facet of the invention in its broadest or most general form. Even as couched in these broad terms, however, it can be seen that this facet of the invention importantly advances the art.

In particular, this apparatus serves as an instrumentality for implementing the broad analytical-framework method of the second aspect discussed above. Although the third major aspect of the invention thus significantly advances the art, nevertheless to optimize enjoyment of its benefits preferably the invention is practiced in conjunction with certain additional features or characteristics. In particular the preferences noted above for the third facet of the invention are applicable here as well.

In preferred embodiments of its fourth major independent facet or aspect, the invention is a printmasking method for use in incremental printing. The method includes the step of establishing a printmask.

Another step is establishing a matrix of stacks of corresponding backup entries for values in the printmask. A further is determining when an individual value in the printmask is nonfunctional.

Yet another step of this novel method is individually replacing exclusively the individual determined nonfunctional value. That value is replaced with exclusively a corresponding individual backup entry from a corresponding stack in the matrix.

The foregoing may represent a description or definition of the fourth aspect or facet of the invention in its broadest or most general form. Even as couched in these broad terms, however, it can be seen that this facet of the invention importantly advances the art.

In particular, this fourth primary aspect of the invention is related to the second and third facets—but here, rather than conceived in terms of initializing a printmask this related analytical core is applied directly to providing an entire robust family of failure-accommodating modes.

Although the fourth major aspect of the invention thus significantly advances the art, nevertheless to optimize enjoyment of its benefits preferably the invention is practiced in conjunction with certain additional features or characteristics. In particular, preferably the determining step determines that plural values in the printmask are nonfunctional, and the replacing step replaces those individual determined values with plural corresponding individual backup entries from plural corresponding stacks, respectively.

Another preference is that the replacing step include rotating entries in the stack for selection. Yet another preference, when multiple individual printing elements are in use, is that the replacing step includes the three substeps mentioned earlier as a preference for the first main aspect of the invention.

In preferred embodiments of its fifth major independent facet or aspect, the invention is a printmasking method for use in incremental printing. The method includes the step of establishing a seminal printmask.

Another step is tiling the established seminal printmask. This tiling step operates to create a larger printmask having closely related properties.

A third step of the method is forming a less-regular printmask by injecting noise into the larger printmask. This step disrupts regularity arising in the tiling step.

A fourth step of this method is using the less-regular printmask. It is used in incremental printing of an image.

The foregoing may represent a description or definition of the fifth aspect or facet of the invention in its broadest or most general form. Even as couched in these broad terms, however, it can be seen that this facet of the invention importantly advances the art.

In particular, this ingenious procedure very simply and elegantly develops, in the field—automatically and very quickly—a quite large printmask. This mask nevertheless can be essentially free of the excessive regularity that has plagued many earlier procedures, sometimes manifesting itself for instance as bizarre, intrusive organ-like crawling shapes in midtone regions.

At the same time, as will be seen, the method need not necessarily result in a mask having excessive irregularity (with consequential overgraininess in printed images). Rather, the degree of randomness vs. determinism can be selected—whether in product design, or manufacture, or later in the field—to obtain in essence any desired balance between image graininess and smoothness.

The fifth major aspect of the invention thus significantly advances the art. Nevertheless to optimize enjoyment of its benefits preferably the invention is practiced in conjunction with added features or characteristics.

In particular, preferably the using step comprises printing in a particular number of passes over some portion of the image; and the establishing step comprises preparation of a mask that is three-dimensional. Here the mask preparation includes forming a matrix of stacks of possible choices of pass number, each of the choices having an associated desired probability of use.

In this preference, the using step includes probabilistically evaluating each choice at a specified level in a stack, each choice being subject to rejection through said evaluating; and the using step also includes, if a choice at the specified level in a certain stack is rejected, shifting entries in the certain stack to bring a different choice to the specified level of the certain stack.

When this preference is in use, one secondary preference is that the shifting include displacing one entry in the stack in a particular direction and by a plural number of levels, and shifting at least some remaining entries in the stack to maintain the stack. Two particularly preferred ways of doing this are moving the one entry from the specified level to a different level, or moving the one entry to the specified level from a different level.

For example, as the specified level is most simply the top or bottom of the stack, the preferred forms of shifting particularly include moving the one entry from e.g. the top of the stack downward by some given number of levels, or moving the one entry to the top (or bottom) from some other identified level.

An alternative (or overlapping) basic preference is that the using step include printing in a particular number of passes over some portion of the image—with the establishing step including preparation of a mask that is approximately cubical. Each side of the mask is a number of pixels or layers approximately equal to the particular number of passes.

In this case, as in the first basic preference discussed just above, a secondary preference is that the mask preparation include forming a matrix of stacks of possible choices of pass number. Each choice has an associated desired probability of use. The using step includes probabilistically evaluating each choice at a top of a stack, each choice being subject to rejection through such evaluating. If a choice in a certain stack is rejected, the using step also includes rotating the certain stack in a particular direction to bring a different choice to the top of the certain stack.

If the preference described in the previous paragraph is adopted, the noise-injecting step preferably includes rotating selected stacks in the larger printmask. In this case, moreover, preferably rotation of a certain stack in the same particular direction, starting from the position of the certain stack in the seminal printmask, tends to introduce greater randomness. Correspondingly, the selected-stack rotating step also preferably includes rotating at least some selected stacks in the opposite direction—so that the noise-injecting step tends to reduce, rather than increase, randomness. Preferably the "particular direction" is upward, and the opposite direction downward.

Another preference, related to the fifth main aspect of the invention and for use with plural printheads, is that (1) the establishing step include defining a respective seminal printmask for each of the plural printheads, (2) the tiling step include tiling each respective seminal printmask to make a respective larger printmask for each of the plural printheads; and (3) the noise-injecting step include inserting noise into each of the respective larger printmasks. In this case preferably the noise-inserting includes inserting into all the respective larger printmasks noise that is substantially identical.

In this regard, however, the method need not operate rigidly. For instance, even if the respective-printmask defining includes replicating a single seminal printmask to form a respective seminal printmask for each of the plural printheads, the method may still preferably include modifying each respective seminal printmask to accommodate respective requirements of its printhead. Thus in this latter case the modifying preferably includes translating or rotating the respective seminal mask to allow for relative misalignments of the plural printheads.

Another sort of preference as to the fifth main aspect of the invention is that it further include—before the using step—making of modifications to the less-regular printmask. These modifications are preferably based on nozzle weighting, or firing-frequency limitations, or parity.

All of the foregoing operational principles and advantages of the present invention will be more fully appreciated upon consideration of the following detailed description, with reference to the appended drawings, of which:

BRIEF DESCRIPTION THE DRAWINGS

FIG. 3 is a like view, but somewhat less enlarged, of a bigger portion of the print engine;

FIG. 4 is a highly schematic perspective view showing conventional tiling of a relatively small printmask to cover an image, each tile being identical to the single, common mask and each printmask element corresponding to one single halftone location at each point where the mask is tiled;

FIG. 5 is a diagram of a printmask, with defective nozzle locations marked by circles, and its single backup array according to a two-dimensional "backup matrix" form of the present invention,;

FIG. 8 is a printmask for a four-pass printmode according to a "precooked mask" form of the invention and configured as a three-dimensional matrix of candidate sequences or "stacks";

FIG. 9 is a conceptual or highly schematic series of five views representing four (or five) steps of a procedure for preparing masks according to a "popup mask" form of the invention;

FIG. 10 is a diagram generally analogous to FIG. 8 but showing instead the fourth step of the FIG. 9 mask-generating procedure;

FIG. 11 is a portion of an exemplary configuration file to initialize printmask generation according to the FIGS. 9 and 10 popup-mask form of the invention;

DETAILED DESCRIPTION OF THE PREFERRED EMBODIMENTS

1. The Printer Mechanism

Figure 1:
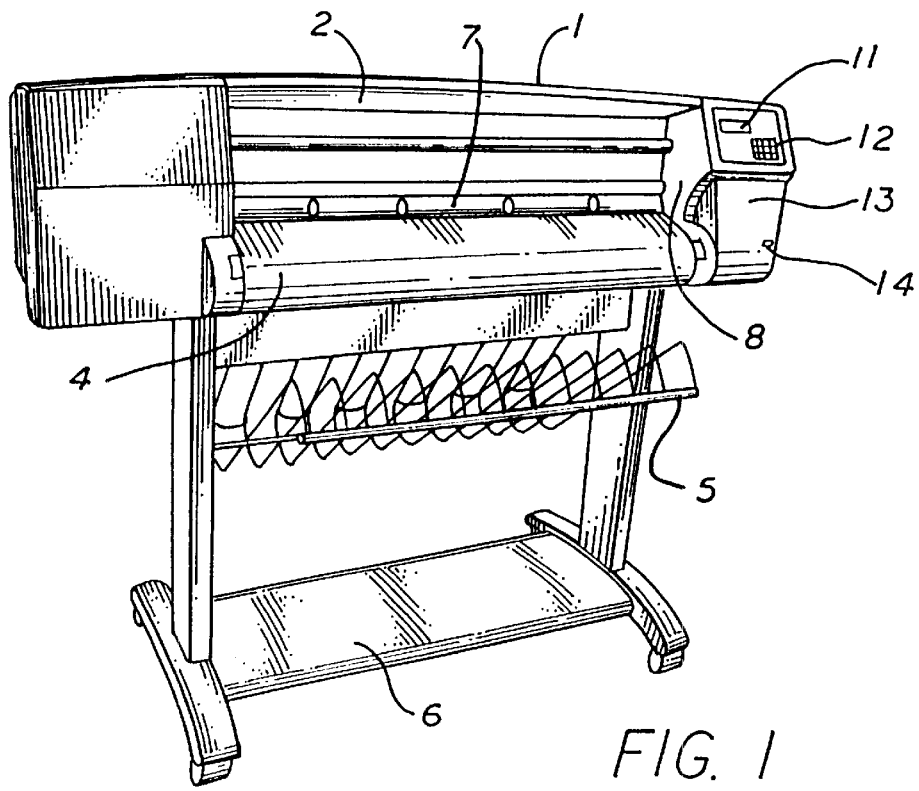
FIG. 1 is a perspective or isometric view of a printer/plotter that is and that incorporates certain preferred embodiments of the invention—though the invention is equally applicable with respect to smaller, desktop types of printers in the consumer market.

The invention is amenable to implementation in a great variety of products. It can be embodied in a printer/plotter that includes a main case 1 (FIG. 1) with a window 2, and a left-hand pod 3 which encloses one end of the chassis. Within that enclosure are carriage-support and -drive mechanics and one end of the printing-medium advance mechanism, as well as a pen-refill station with supplemental ink cartridges.

The printer/plotter also includes a printing-medium roll cover 4, and a receiving bin 5 for lengths or sheets of printing medium on which images have been formed, and which have been ejected from the machine. A bottom brace and storage shelf 6 spans the legs which support the two ends of the case 1.

Just above the print-medium cover 4 is an entry slot 7 for receipt of continuous lengths of printing medium 4. Also included are a lever 8 for control of the gripping of the print medium by the machine.

A front-panel display 11 and controls 12 are mounted in the skin of the right-hand pod 13. That pod encloses the right end of the carriage mechanics and of the medium advance mechanism, and also a printhead cleaning station. Near the bottom of the right-hand pod for readiest access is a standby switch 14.

Within the case 1 and pods 3, 13 a cylindrical platen 41 (FIG. 2)—driven by a motor 42, worm 43 and worm gear 44 under control of signals from a digital electronic processor—rotates to drive sheets or lengths of printing medium 4A in a medium-advance direction. Print medium 4A is thereby drawn out of the print-medium roll cover 4.

Meanwhile a pen-holding carriage assembly 20 carries pens back and forth across the printing medium, along a scanning track—perpendicular to the medium-advance direction—while the pens eject ink. The medium 4A thus receives inkdrops for formation of a desired image, and is ejected into the print-medium bin 5.

As indicated in the drawing, the image may be a test pattern of numerous color patches or swatches 56, for reading by an optical sensor to generate calibration data. For present purposes, such test patterns are for use in monitoring for and detecting printing elements (e.g. nozzles) that are performing poorly or not at all.

A small automatic optoelectronic sensor 51 rides with the pens on the carriage and is directed downward to obtain data about pen condition (nozzle firing volume and direction, and interpen alignment). The sensor 51 can readily perform optical measurements 65, 81, 82 (FIG. 12); suitable algorithmic control 82 is well within the skill of the art, and may be guided by the discussions in the present document.

A very finely graduated encoder strip 36 is extended taut along the scanning path of the carriage assembly 20 and read by another, very small automatic optoelectronic sensor 37 to provide position and speed information 37B for the microprocessor. One advantageous location for the encoder strip 36 is immediately behind the pens.

A currently preferred position for the encoder strip 33 (FIG. 3), however, is near the rear of the pen-carriage tray—remote from the space into which a user's hands are inserted for servicing of the pen refill cartridges. For either position, the sensor 37 is disposed with its optical beam passing through orifices or transparent portions of a scale formed in the strip.

The pen-carriage assembly 20 is driven in reciprocation by a motor 31—along dual support and guide rails 32, 34—through the intermediary of a drive belt 35. The motor 31 is under the control of signals from the digital processor.

Naturally the pen-carriage assembly includes a forward bay structure 22 for pens—preferably at least four pens 23–26 holding ink of four different colors respectively. Most typically the inks are yellow in the leftmost pen 23, then cyan 24, magenta 25 and black 26.

Another increasingly common system, however, has inks of different colors that are actually different dilutions for one or more common chromatic colors, in the several pens. Thus different dilutions of black may be in the several pens 23–26.

As a practical matter, both plural-chromatic-color and plural-black pens may be in a single printer, either in a common carriage or plural carriages.

Also included in the pen-carriage assembly 20 is a rear tray 21 carrying various electronics. The colorimeter carriage too has a rear tray or extension 53 (FIG. 3), with a step 54 to clear the drive cables 35.

Figure 2:
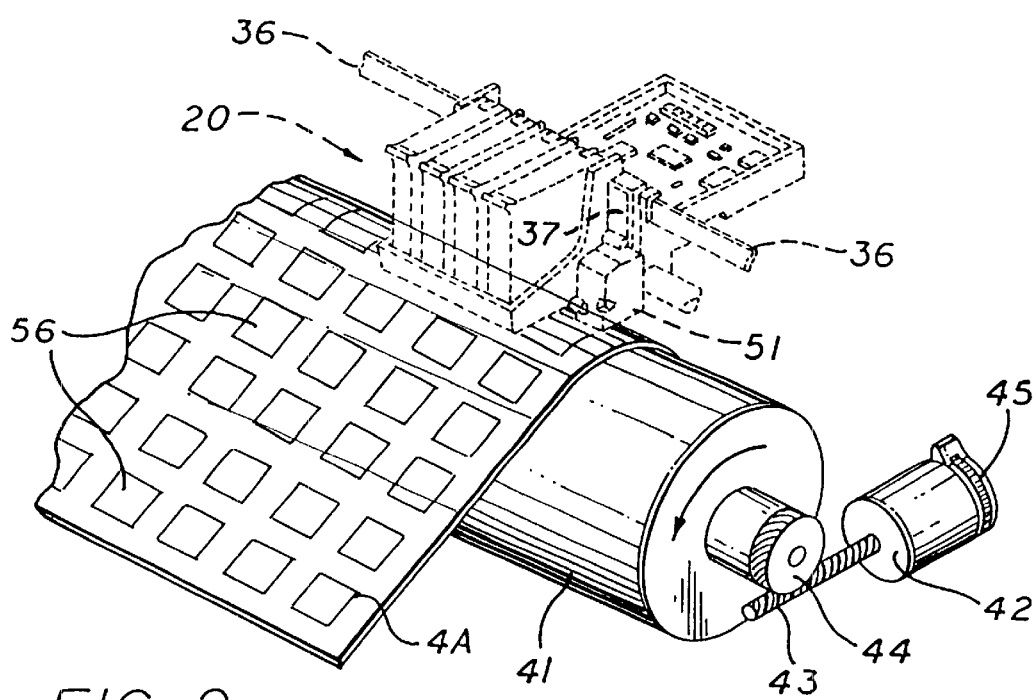
FIG. 2 is a like view, but enlarged, of portions of a printing engine particularly including the printing-medium advance mechanism—within the FIG. 1 printer plotter.

FIGS. 1 through 3 most specifically represent a system such as the Hewlett Packard printer/plotter model "DesignJet 2000CP", which does not include the present invention. These drawings, however, also illustrate certain embodiments of the invention, and—with certain detailed differences mentioned below—a printer/plotter that includes preferred embodiments of the invention.

2. Backup Matrix

This printmask modification method maintains the global quality of the original printmask, and achieves a good local quality in locations where the defective nozzle was replaced. It requires practically no additional computations, and the excessive load caused by the defective nozzle is uniformly distributed over a set of replacement nozzles.

This invention concerns a fourth method, different from handmade masks, mask redesign or "backup nozzle"—Backup Matrix, which does not compromise the original quality at those lines where the damaged nozzle was not employed, while at lines affected by the damaged nozzle it achieves suboptimal printmask quality.

With the backup matrix method every nozzle has a location-dependent backup. This way, when all the nozzles in a printmask line are operational the original printmask pattern is maintained.

In lines with a defective nozzle the printmask pattern is modified, though only in defective nozzle locations. In contrast to the backup nozzle method, the replacement nozzle in those locations is chosen so as to be optimal with respect to the fixed surrounding pattern and the printmask requirements.

Since every location in the printmask has a different backup it is only natural to keep backups in the same matrix form as the printmask itself. Note that the entries of both matrices are pass numbers which map (in a line-dependent manner) to nozzles.

Thus, when a defective nozzle is to be replaced, the pass number corresponding to the inverse mapping is replaced by the pass-number entry of the same location in the backup matrix. For example, suppose the printmask and the corresponding backup matrix are as in FIG. 5 and a defective nozzle has been detected, whose inverse mapping is shown below.

| Line | 1 | 2 | 3 | 4 | 5 | 6 |
|---|---|---|---|---|---|---|
| Pass | — | 6 | — | 4 | — | 3 |

The matrix form of the backup-matrix method is especially effective and natural in the printmask design process, during which printmask entries are iteratively optimized. Entries are modified in turn as follows.

Printmask entries are approached in an ordered, random, or adaptively determined sequence. The pass numbers are ordered according to their fit to the printmask requirements and the printmask entry is modified to contain the best fit. This order may be induced by either deterministic or random functions.

Figure 6:
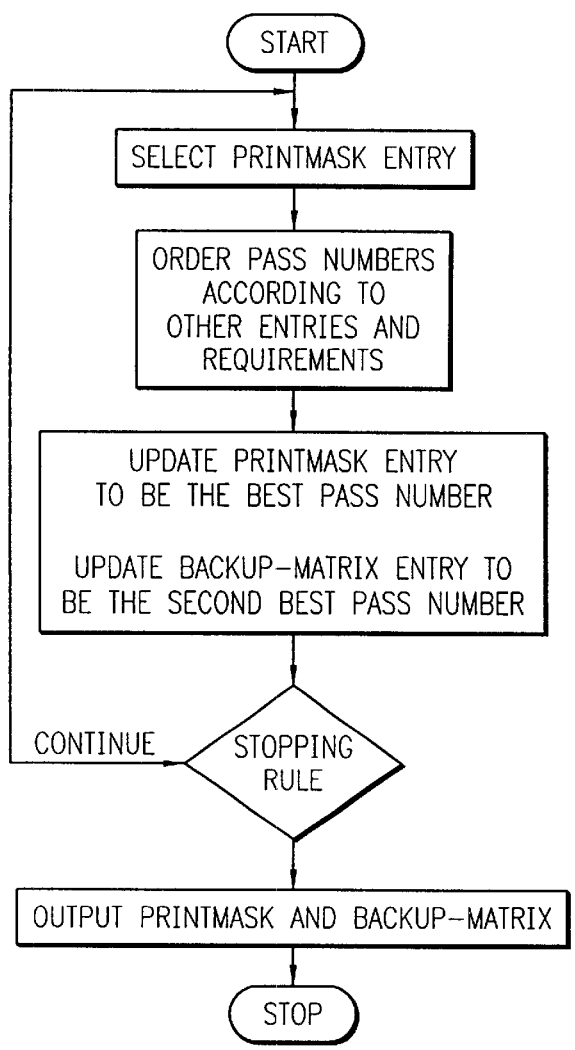
FIG. 6 is a flow chart for simultaneous design of a printmask and backup matrix, to implement the FIG. 5 form of the invention.

Since backup-matrix entries should contain the best alternatives to the printmask entries, the backup matrix could be designed simultaneously with the printmask, so that in each iteration backup matrix entries contain second best options. See FIG. 6 for a flow chart describing this design method.

Figure 7:
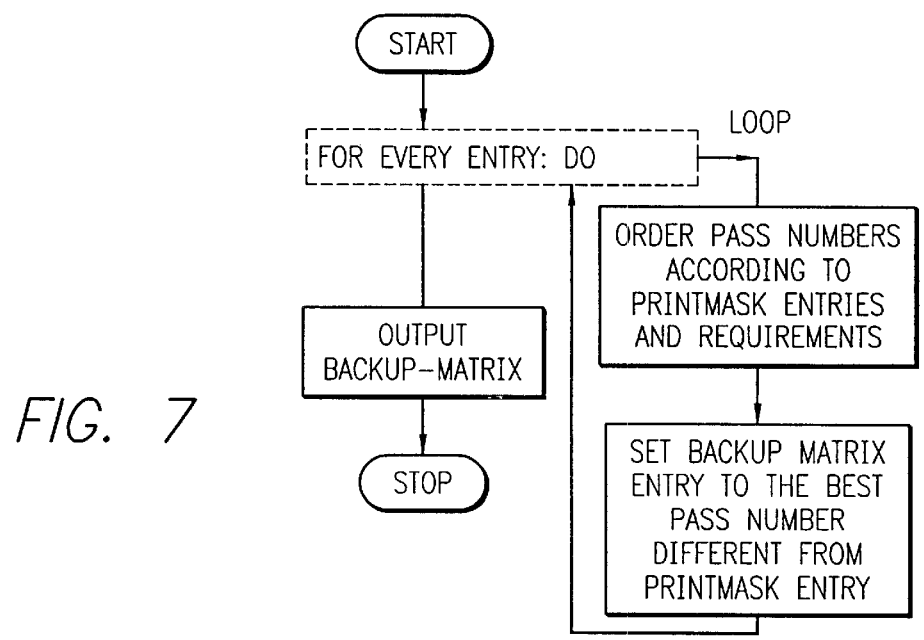
FIG. 7 is a like chart but for separate design of a backup matrix after the principal printmask is complete.

Alternatively, the backup matrix could be filled sequentially, with best alternatives after the printmask has been optimized. See FIG. 7 for a flow chart describing this design method.

Additional implementation options include the following.

More than one backup matrix may be used. A series of (e.g. two) backup matrices could be used so that if the backup nozzle assigned for a defective nozzle is also out of order, a second backup (stored in the second backup matrix) would be available.

The printmask design requirement in the second backup-matrix design method may be augmented with backup-specific design rules. For example the pattern of the backup matrix in FIG. 2 would be considered bad in a printmask; as back-ups all the entries fit well into the printmask, but in case two nozzles assigned to nearby printmask locations are to be replaced, it could cause severe printing artifacts. To prevent such problems, additional requirements, on the pattern of the resulting backup matrix, should be added.

3. Precooked Masks

This more-advanced form of the invention never forbids using a nozzle—unless required by physical (electronic) limitations on frequency of use. Apart from this usage-frequency restriction, i.e. as long as it is nozzle weighting for printmask purposes that is under consideration, this form of the invention at most lowers a nozzle to the bottom of a priority list. Nevertheless, the bad nozzle always has the chance to print. Preferably there is never any exception to the algorithm, and it will actually print if one or a combination of the following conditions requires it.

All the needed drops per cell__600 must be addressed.

There are only N passes in which to do so.

The frequency restrictions on the pen are stronger than any Nozzle Weighting criterion. In fact, these are the top-priority restrictions, and nozzles affected by them will not just fall to the bottom of the priority list, they will actually be discarded from the list.

Also supported by this form of the invention are:

Variable Paper-Advance Printmodes (compatible with multilevel printing) as introduced by Zapata; and Pass-Dependent Nozzle Weighting: Variable Paper Advance Printmodes have new drawbacks that can be made up for with this new technique (nozzle usage is specified for every single pass).

The precooked masks are generated by a new version of Shakes.

The precooked mask is a three-dimensional matrix (FIG. 8). One might think of it as a stack of matrices. It is better thought of as a matrix of stacks. That is, for every single location on the paper, a full range of candidates is offered.

If there is a four-pass mask, four candidates will be offered, sorted from the best to the worst. The criteria to tell the best from the worst are similar to Shakes' neighboring constraints, but extrapolated to 3-D neighbors.

This precooked mask may be generated on the fly for each plot, or generated at printer's initialization, or kept in a hard disk all the time. When the printer needs to print, the precooked mask is retrieved or generated, and then the reheating process begins.

The reheating process basically consists of picking, for each print level, a candidate from the list. Although, by default, the first-level mask will pick the best candidate, the second-level mask will pick the second best candidate and so on, things are not that obvious when Nozzle Weighting enters into the game.

In order to implement Nozzle Weighting, the best possible candidate is picked with a probability that is proportional to the nozzle weight. That is, if nozzle weight is 1000, the best candidate is picked for level 1 with a probability of 100%. If the next candidate nozzle is also weighted with a 1000, it will be picked for the mask that corresponds to level 2 and so on.

If, however, the best candidate from the precooking process turns out to have a weight of 600, this nozzle will be picked in 60% of the cases. In the remaining 40% of the cases, the next candidate in the list will be evaluated for that position, and the rejected nozzle is moved to the lowest rank of the list, just in case it can help filling up higher levels of the mask.

The new candidate that is evaluated may again be picked or rejected, depending on its weight. The necessary precautions have been included in the algorithm to prevent rejection of all the candidates. The described probabilistic process is repeated for each layer that is to be filled up.

Every time a candidate is evaluated, its weight will be a function of:

The step advance sequence (this is how Variable-Advance Printmodes can be supported).

The number of the pass being fired at (this is how Pass-Dependent Nozzle Weighting can be supported).

In general, any other factor could influence the weight of a certain nozzle, when firing at a certain pass.

Nozzles rejected by the second, third layers and so on, will also be moved to the bottom of the priority list. This means that the first rejected nozzle is no longer at the bottom of the list, and could therefore be selected.

Another criterion also takes part in the reheating process—namely, depending on the carriage velocity that is chosen for the printmode, it may be decided that a single nozzle cannot shoot on two adjacent locations. This means that, when printing at sufficiently fast carriage speeds, if nozzle 1 has been selected to fire in position X, for layer 2, the same nozzle will not be allowed to fire in position X+1, for any mask level.

This nozzle will not be dropped to the bottom of the priority list; it will just be taken out of the list, because this is the only way to ensure that a nozzle is not fired. Notice that this absolute rejection only occurs based on firing-frequency restrictions, so that nozzle 1 can fire again in position X+2.

This is important, because the only time it can be said for sure that a nozzle will not be fired, the proposition accounts for a single location, not for a full row (as was the case in Error Hiding). The same process, out of the same precooked mask, can be repeated for all the printheads in the printer, considering in each case the corresponding nozzle weights.

Additional techniques, such as matrix shifting, can be applied so that the two masks look different even if the nozzle weights for different printheads are all set to 1000. It may be helpful to summarize some of the innovations in preferred embodiments detailed to this point:

The combination of N nozzles that print on a single row (N being the number of passes) can be unique for the whole mask, thanks to use of variable paper advance. Earlier, by comparison, a combination of N nozzles was repeated N times across the mask.

Error hiding need not be used any longer. Instead preferably each nozzle is given a printing probability in the range from zero to one hundred percent of its nominal usage. This new concept, nozzle weighting, is advantageously varied from swath to swath to provide pass-dependent nozzle weighting.

When a nozzle prints below its nominal usage, other nozzles make up for the difference. These other nozzles are not exactly backup nozzles, because they can also compensate for only a part of the work of a below-nominal nozzle. Earlier, what was replaced by one or a plurality of backup nozzles was the entire function of the original nozzle.

When a nozzle prints below its nominal usage, up to $N \cdot (N-1)$ nozzles can compensate for it, thanks to the variable advance. Earlier, only $N-1$ nozzles could participate in compensation.

All these forms of nozzle management can be realized for multilevel printing—i.e. for different numbers of drops projected into the same cell. Earlier, only binary printing was demonstrated.

A mask for supporting all these features can be generated in two completely independent steps.

The first step is computationally expensive, but common for all the printheads in a printer. It can be generated either inside or outside the printer, and it provides the texture of the mask as well as all the possible combinations ($N^{rows \cdot columns}$ combinations, for the first level only).

The second step is printhead-dependent, but much cheaper in terms of computational effort, and it can even be executed before every single printout. It provides the nozzle management functionality, computed cell by cell through the use of randomization features.

Thus precooked-mask features enable modulation of nozzle usage differently for every single row (potentially every single location) in the mask and for arbitrary print-medium advance. The initial precooking stage, advantageously generic and invariant, is preferably followed by a cell-by-cell algorithm that adapts dynamically to printhead conditions, and other conditions—and can be executed very often and very quickly.

4. Popup Masks

The present disclosure offers a new method to have better control of precooked mask generation.

During improvement of the way that each individual nozzle is used in the mask, precooked masks were invented. They are successful in recalculating nozzle weighting in a very short time, but it looks like it is still harder to generate a precooked mask out of a syntactical statement.

This is due to the fact that as many layers as number of passes are defined for the precooked mask, and it becomes very difficult to predict how each statement will work in the whole set of mathematical transformations that lead from syntax to mask generation. It is also hard to specify how the masks for different pens should interact.

A main objective of this part of the invention is to have better control of precooked mask design. As handmade precooked masks are to be fed into the same reheating process as was used for larger precooked masks, a process is needed that substantially enlarges handmade precooked masks. An analogy is popcorn in the microwave oven; this is how handmade precooked masks are transformed by the Popup process!

So to start with, the invention returns to the old handmade mask methods. With awareness of the problems and virtues of all the described methods, it is desired to have the best of each. Therefore, the following algorithm (FIG. 9) is run.

1. The designer builds a small mask (handmade method) that follows the precooked mask format. For N passes, what is likely to be generated is a mask that is N×N pixels large, and has N layers. It will be called A.
2. Mask A is replicated for every printhead (so P times), applying the translations and/or rotations that the designer requires. This process is also manual, and allows a very good control on color-to-color dot placement, in a given pass.

Now there are P masks that are derived from A. These will be called $B_1, B_2 \ldots B_p$. As they have the format that corresponds to precooked masks, they may be so called.

The number of bytes that will be required is $P \times N^3$. If P=6 and N=8, the total amount of memory is 3 kBytes (compare the 2 Mbytes given by the old precook method!). These are the data to feed to the Popup process.

3. Masks $B_1$ are small, so they must be replicated many times to achieve the size of the old precooked masks, and to obtain $C_1$ masks. This is a new intermediate process, between precooked and reheating, called Popup process.
4. Still in the Popup process, noise is injected into the replicated masks $C_1$. Preferably the same noise is injected into all the masks, so that any pen-to-pen dependence that is introduced is preserved.

Noise injection consists of popping some candidates down in the candidate list (FIG. 10). This noise can be generated automatically by the Popup process, following some determined function of distribution of probability, or can be directly fed by the mask designer, in the form of a matrix: Lambda-matrix, or Λ-mask, or Lambda-mask (in this document usually presented in all capital letters).
5. At this point, there is a set of $D_1$ masks, similar to the old precooked masks, and ready to be processed by the old reheating process (i.e., by applying nozzle-weighting, and frequency and parity constraints). The result is the final Shakes masks, $E_1$.

The purpose here is to improve the method by which printmasks are generated. Goals include:
 better control of printmask design;
 gradual transition from regular to fuzzy masks;
 nozzle weighting does not make masks fuzzier;
 less memory required—a mask may fit in the cache;
 export to other artisans.

Figure 14:
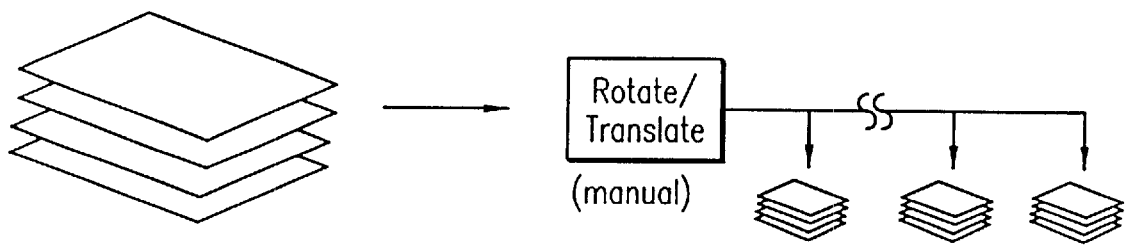
FIG. 14 is a diagram, highly schematic, showing the first two steps of the Popup procedure.

Here is the heart of the preferred embodiments of this part of the invention:
1. Precooked mask, handmade, small (e.g., 8×8×8—see left end of FIG. 14).
2. One precooked mask per pen. These masks are still small, ideal (not fuzzy) and fully under the designer's control (see center and right end of FIG. 14). Total memory: six pens×8×8×8=3 kBytes!
3. Data into Shakes: the six precooked masks (in SCM format), plus cooking variables, plus paper advance and first-nozzle information; and, optionally, Lambda-mask—COOKING VARIABLES:

| | |
|---|---|
| FREQUENCY ∈ [0,10], ∈ N | 0: restricted |
| | 10: totally free |
| PARITY ∈ [0,10], ∈ N | 0: never same parity between 2 layers |
| | 10: no restriction |
| MASK SIZE | [u16] [u16] [u16] |
| NUMBER OF PASSES | [u16] |
| RANDOM = λ ∈ (0, 10) ∈ IR  (0, 1000) | [float] |
| 0 — do nothing | [u16] |
| PAPER ADVANCE (pass) | [u16] |
| FIRST NOZZLE (pass) | [u16] |
| (for Variable | |
| Advance) NOZZLE WEIGHT (nozzle) (pass) | [u16] |
| PRECOOKED MASKS (x) (y) (z) (pen) | [u16] |
| LAMBDA-MASKS (x) (y) | [u16] |

Figure 15:
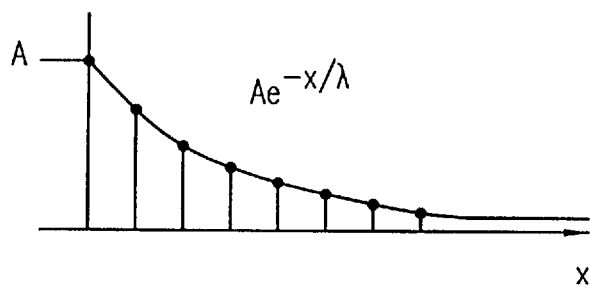
FIG 15 is a rough graph of a negative exponential distribution function used in generating random numbers.

This one is alternative to RANDOM (i.e., RANDOM must be set to 0, for LAMBDA-MASK to be valid)
(If RANDOM=0 and no LAMBDA-MASK, no randomization will be applied to the precooked masks.)
4. With all the above data fed into the reheating/cooking process, do the following.
 4a. If the precooked mask is full-size (i.e., equal to cooked-mask size), and RANDOM=0, and no LAMBDA-MASK go directly to classical reheating (the one already implemented): step 6 below.
 4b. If the precooked mask is smaller, tile it up to the final size.
 4c. Apply LAMBDA-MASK.
5. APPLY LAMBDA-MASK:
 5a. If LAMBDA-MASK is smaller than final size, tile it up.
 5b. If no LAMBDA-MASK, create it:
  LAMBDA-MASK(i)(j)=floor (random ('Exponential', lambda)); LAMBDA-MASK ∈ (0, no.pass 1)
  This means random numbers are generated from 0 to (number-pass−1), following a negative exponential distribution function (FIG. 15):

$$\sum_{0}^{N-pass-1} A e^{-x/\lambda} = 1 \rightarrow A = \frac{1}{\sum_{0}^{N-1} e^{-x/\lambda}}$$

5c. At this point,

```
1_matrix = floor (ramdom 'Exponential', 0.7, 12, 12)
1_matrix =
0 0   0   0   0   0   1   0   0   0   1   1
0 0   0   0   0   0   0   1   1   0   0   1
1 1   0   0   0   0   1   0   1   0   2   0
1 0   1   0   0   0   1   0   0   0   0   1
0 0   0   1   1   0   0   0   0   0   0   0
0 0   0   0   0   0   0   0   1   0   0   0
0 0   0   0   0   0   0   0   0   0   0   0
1 0   1   0   0   0   0   0   0   0   0   0
0 0   0   1   0   0   0   0   0   0   0   0
```

-continued

| | | | | | | | | | | | | |
|---|---|---|---|---|---|---|---|---|---|---|---|---|
| 0 | 0 | 0 | 0 | 1 | 1 | 0 | 1 | 1 | 0 | 0 | 0 |
| 0 | 0 | 0 | 0 | 0 | 0 | 0 | 0 | 2 | 0 | 0 | 0 |
| 1 | 1 | 2 | 0 | 0 | 0 | 0 | 0 | 0 | 0 | 0 | 0 |

(Some of the syntax used in this document is for the commercially available software package known as Matlab®.) Note that, if LAMBDA-MASK comes from outside, any distribution function can be used.

What do these numbers mean? One meaning is: pop the best candidate X places down. Normally X=0, so that the final mask is quite similar to the original precooked mask. When X=1, addition of noise to the original precooked mask begins.

Another meaning, now preferred to that above, is this: pop the Xth-best candidate ($X \in [0, N-1]$) up, to the top. The intervening ones—i.e., those candidates initially above that Xth-best one—all fall down one position.

More or less noisy masks can be made by applying the suitable LAMBDA-MASK, or by varying RANDOM through trial and error. The bottom line is that there is a continuum from perfect, regular printmasks to fuzzy masks.

Note also that the candidate which was making a regular mask is popped one position down in the candidate list for a given position. If nozzle-weighting is applied, that candidate can be chosen again, therefore turning ramps and error-hiding areas into regular geometries rather than making them noisier than the average.

To summarize the process from another perspective, in preferred popup methods basically the Λ-mask or LAMBDA-MASK provides the values for X. In a LAMBDA-MASK, values ranging from 0 to N−1, where N is the total number of layers in the popup mask, are distributed according to an exponential distribution. In this distribution, the relative majority of the values are zeroes—as seen in the exemplary matrix above.

Figure 16:
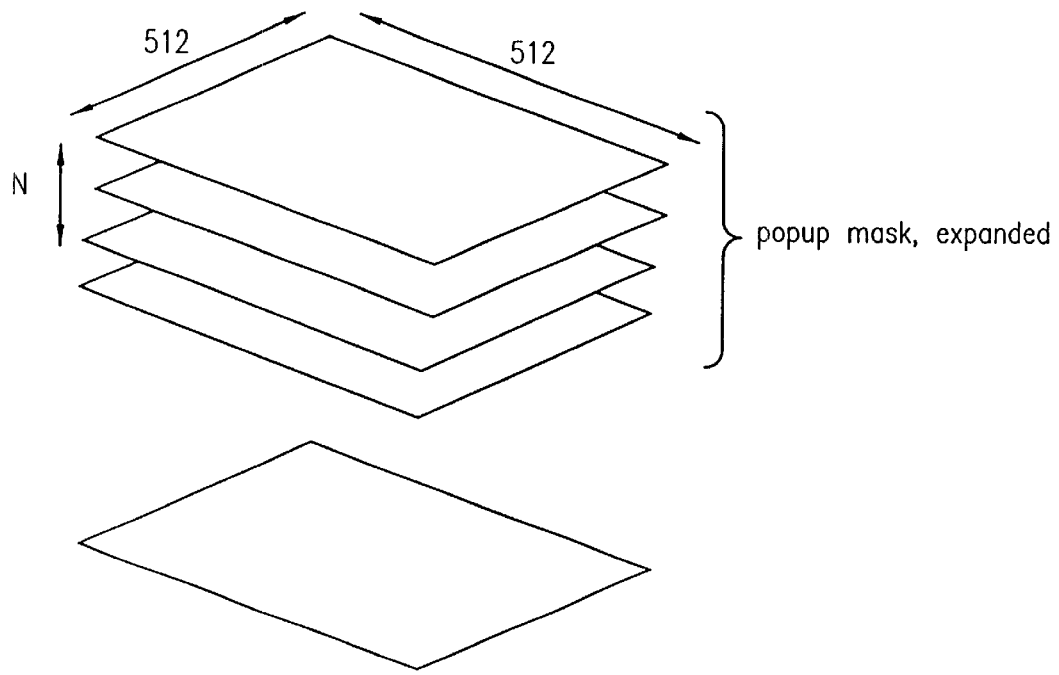
FIG. 16 is a diagram, extremely schematic, showing how a Lambda-matrix steers the Popup process.

The LAMBDA-MASK can be automatically or manually designed so that the quantity of each value in such mask respects such distribution. If, as suggested in FIG. 16,—Λ(x,y)=0 for all values of x and y, then Λ does nothing—i.e., no noise is injected.

For values greater than 0, noise is injected. Normally, for X=0 by default no noise injection occurs; in a preferred embodiment, only a small fraction of cells receive noise injection.

Figure 17:
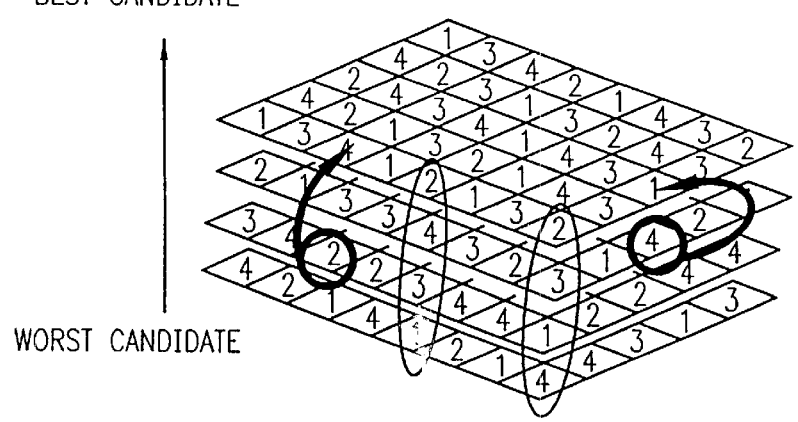
FIG. 17 is a diagram like FIGS. 8 and 10—but for a more-highly preferred "pop back" variant method.

If a suitable statistic is constructed, the values in the Λ matrix appear as in the FIG. 17 graph—peaking at zero. Accordingly zero is the most usual value inside a Λ mask. A Λ mask can be filled, defined, either manually or automatically—as for instance with Matlab® procedures.

After application of the same LAMBDA-MASK to all the precooked masks, what results is new precooked masks with a certain degree of fuzziness. Yet they still remind much of the original, regular structure.

The same LAMBDA-MASK is applied, in order to keep any pen-to-pen consideration that existed in the original precooked masks (i.e., if desired, on a certain pixel to have M printed on pass 1 and C on pass 2, we may change to M on pass 2 and C on pass 3, but not change M to pass 2 and still keep printing C on pass 2).

6. Classical Reheating

The procedure arrives here with the usual situation: for a given pen, there is a full-size, fuzzy, precooked mask, and nozzle maps and frequency and parity restrictions are to be applied.

It is necessary, though, to consider a new variable: when building the correspondence between mask row, number of pass and nozzle, the procedure must consider the first nozzle that prints (not always nozzle 1), besides the step advance to be made. Nozzle weighting per pass must be adjusted accordingly.

7. Final Mask Translation

Previously masks were shifted 32 positions to the right for each different pen. This will not be done, unless step 5 was skipped (that is, if still working with old-style precooked masks, the previous old procedure is used; otherwise there is no step here).

8. Testprints

For an easier check, Shakesmall inside the printer should make LAMBDA-MATRIX available to inspection. It would also be helpful to build a matrix for each pen, showing the total pixels that have been modified from the original regular mask (that is, mark 1 in all the pixels affected by LAMBDA-MASK or nozzle weighting).

This can be done using any simple straightforward tabulation script, readily prepared by a person of ordinary skill in the art. The inventors have done so with just such a straightforward internal software utility of Hewlett Packard Company.

This is a summary of the Popup innovation:

1. A new process, called Popup, allows use of a new format of precooked masks, that is substantially smaller than before (3 kB vs. 2 MB).
2. Popup process consists of replicating a small precooked mask and injecting noise into the replicates, so that masks are not regular any more.
3. Same or different noise patterns can be injected into different masks. A preferred embodiment is, that the same noise pattern is used. This allows control of pen-to-pen interactions, even after noise is injected.
4. The noise pattern can be directly defined by the user, in the shape of a bidimensional matrix, or generated by the Popup algorithm. In the latter case, the user must only specify one number, which delivers a continuum progression between regular and random masks (i.e., if the noise parameter is 0, masks are still regular; the larger the noise parameter, the noisier the masks).
5. The noise-injection method is complementary to the nozzle-weighting method, in the sense that, when the default nozzle is discarded as a candidate, the next candidate in the list can make the mask even more regular. This means that a nozzle-weighting algorithm need no longer be a means of adding excessive noise to the mask.
6. This method allows a better transition to fuzzy masks, for those artisans who have a long tradition of handmade masks.

5. Hardware and Program Implementations of the Invention

Figure 12:
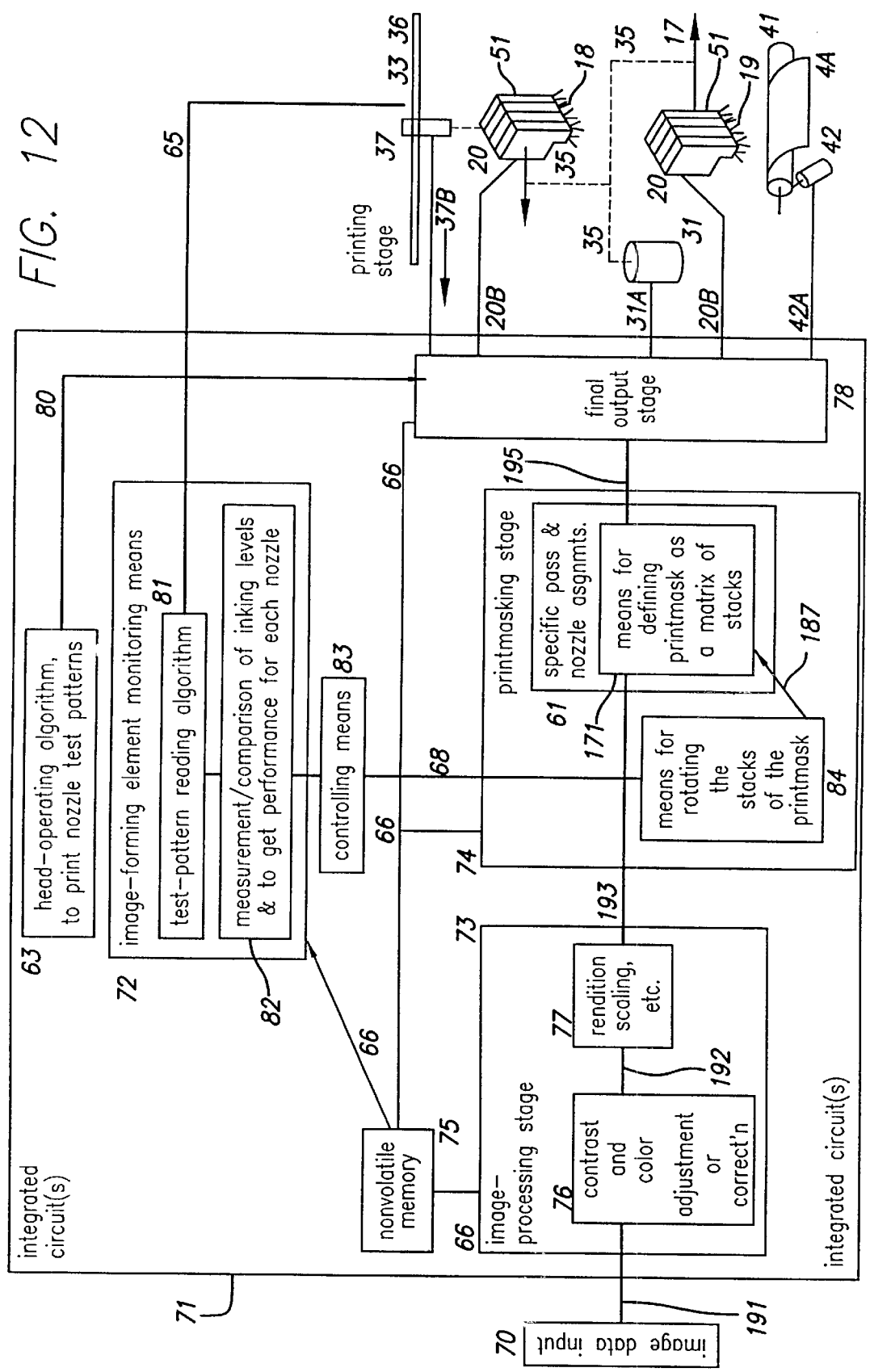
FIG. 12 is a schematic block diagram, focusing upon the functional blocks within the program-performing circuits of the preferred embodiment.

Before discussion of details in the block diagrammatic showing of FIG. 12, a general orientation to that drawing will be offered. In FIG. 12, most portions 70, 73, 75–78 across the center, including the printing stage 4A-51 at far right, are generally conventional and represent the context of the invention in an inkjet printer/plotter such as that of FIGS. 1 through 3.

The remaining central portions and the upper portions of FIG. 12 relate to the present invention particularly. These portions are discussed below.

Now turning to details, the pen-carriage assembly is represented separately at 20 (FIG. 12) when traveling to the left 16 while discharging ink 18, and at 20' when traveling to the right 17 while discharging ink 19. It will be understood that both 20 and 20' represent the same pen carriage.

The previously mentioned digital processor 71 provides control signals 20B to fire the pens with correct timing, coordinated with platen drive control signals 42A to the platen motor 42, and carriage drive control signals 31A to the carriage drive motor 31. The processor 71 develops these carriage drive signals 31A based partly upon information about the carriage speed and position derived from the encoder signals 37B provided by the encoder 37.

(In the block diagram all illustrated signals are flowing from left to right except the information 37B fed back from the sensor—as indicated by the associated leftward arrow.) The codestrip 33 thus enables formation of color inkdrops at ultrahigh precision during scanning of the carriage assembly 20 in each direction—i.e., either left to right (forward 20') or right to left (back 20).

New image data 70 are received 191 into an image-processing stage 73, which may conventionally include a contrast and color adjustment or correction module 76 and a rendition, scaling etc. module 77.

Information 193 passing from the image-processing modules next enters a printmasking module 74, typically including a stage 61 for specific pass and nozzle assignments. The latter stage 61 performs generally conventional functions, but in accordance with certain aspects of the present invention also particularly includes means 171 for defining or creating the printmask as a matrix of stacks.

Also part of the printmasking module 74 are means 84 for rotating the stacks of the printmask matrix. The matrix structure established in the creating means 171 is conditioned or configured 187 by the rotating means 84, as indicated in the earlier "Summary of the Disclosure" part of this document, and further in sections 3 and 4 above.

Information for driving the rotating means 84 is derived by a module 63 that controls 80 the final output stage 78 to print nozzle test patterns for reading by the sensor 51, FIG. 12 (or if preferred to eject inkdrops selectively into an optical detector, not shown, that senses the drops directly, e.g. while in flight). The resulting sensor signal 65 is monitored in a monitoring module 72.

That module operates according to a program 81 for reading the sensor signal, and another program stage 82 that measures the signals, and compares some signals with others, to determine inking levels and thereby determine the performance for each band of the printheads. The results of these measurements are massaged in a control stage 83, deriving an operating signal 68 for the previously introduced rotating means 84.

The means represented by the several operational blocks 63, 72, 83, 61, 84 of the present invention—as well as the conventional modules 73, 74, 74, 78, and also the swath-characteristic-varying functions 171, 176, 181 as shown—are implemented within integrated circuits 71. Given the statements of function and the swath diagrams presented in this document, an experienced programmer of ordinary skill in this field can prepare suitable programs for operation of the circuits.

As is well known, the integrated circuits 71 may be part of the printer itself, as for example an application-specific integrated circuit (ASIC), or may be program data in a read-only memory (ROM)—or during operation may be parts of a programmed configuration of operating modules in the central processing unit (CPU) of a general-purpose computer that reads instructions from a hard drive.

Most commonly the circuits are shared among two or more of these kinds of devices. Most modernly, yet another alternative is a separate stand-alone product, such as for example a so-called "raster image processor" (RIP), used to avoid overcommitting either the computer or the printer.

Figure 13:
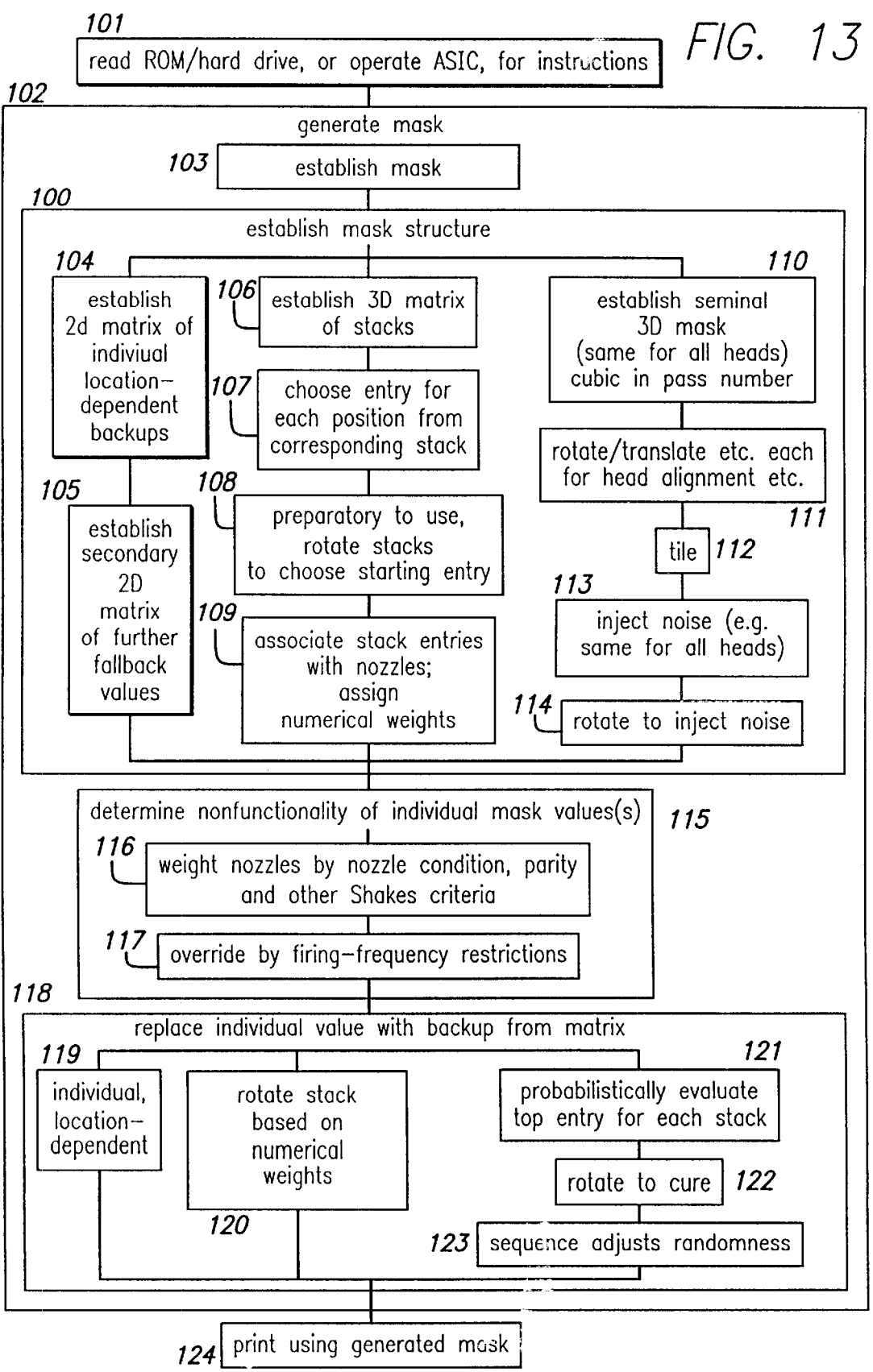
FIG. 13 is a program flow chart illustrating operation of preferred embodiments for some method aspects of the invention.

In operation the system first retrieves 101 (FIG. 13) its operating program appropriately—i.e., by reading instructions from memory in case of a firmware or software implementation, or by simply operating dedicated hardware in case of an ASIC or like implementation. Once prepared or initialized in this way, the method proceeds to generation 102 of a printmask.

This includes four main substeps: mask establishment 103, matrix-structure establishment 100, nonfunctionality determination 115, and then replacement 118 of individual values with backups from the matrix—in accordance with the particular preparations made in the earlier stages 103, 100, 115. Within each of the second and fourth of these four main substeps—i.e. in the matrix-establishment and replacement modules 100, 118—three separate parallel vertical columns of processes appear.

From left to right, these columns correspond respectively to the three modes of operation described above, namely "backup matrix", "precooked masks" and "popup masks". The processes within the nonfunctionality-determination stage 115 are generally applicable to the latter two of these modes, though described above perhaps most particularly with respect to popup masks.

Finally the apparatus proceeds with printing 124, through iteration 127 of the operational steps 125, 126. In view of the foregoing it is believed that a person skilled in this field will find the details of FIG. 13 self explanatory.

The above disclosure is intended as merely exemplary, and not to limit the scope of the invention—which is to be determined by reference to the appended claims.

What is claimed is:

1. A printmasking method for use in incremental printing; said method comprising the steps of:

establishing a printmask;

establishing a matrix of corresponding backup entries for values in the printmask;

determining when an individual value in the printmask is nonfunctional; and individually replacing exclusively the individual determined nonfunctional value with exclusively a corresponding individual backup entry from the matrix.

2. The method of claim 1, particularly for use with multiple printing elements, each printing element being used in multiple locations of the printmask; and wherein:

the matrix of backup entries provides a location-dependent backup for substantially each printing element.

3. The method of claim 1, for use in printing an image by a printer and wherein:

the two establishing steps are both performed, before the printer begins printing the image.

4. The method of claim 3, wherein:

the two establishing steps are both performed before the printer is first placed in service.

5. The method of claim 1, wherein:

the matrix-establishing step is substantially concurrent with and interleaved with the printmask-establishing step so that each matrix entry is selected substantially as a best alternative to its corresponding printmask entry.

6. The method of claim 1, wherein:

the matrix-establishing step is performed after substantially the entire printmask-establishing step is complete.

7. The method of claim 1, further comprising the steps of:

establishing a second backup matrix of further backup entries;

determining when an individual value in the first-mentioned matrix is nonfunctional; and individually replacing exclusively the individual determined nonfunctional value of the first-mentioned matrix with exclusively a corresponding individual backup entry from the second backup matrix.

8. A printmasking method for use in incremental printing; said method comprising the steps of:

establishing a printmask in the form of a matrix of stacks of corresponding entries for positions in the printmask;

individually selecting an entry for substantially each position in the printmask, respectively, by choosing an individual entry from the corresponding stack in the matrix; and printing an image using the respective individually selected entry at substantially each position in the printmask.

9. The method of claim 8, wherein:

the selecting step comprises rotating entries in the stack for selection.

10. The method of claim 8, for use with multiple individual printing elements; wherein the selecting step comprises:

associating a respective individual printing element with each entry in each stack; and identifying with the associated printing element a respective numerical weight; and applying to each entry in the stack a selection probability related to the identified numerical weight.

11. The method of claim 10, wherein the numerical weight for each element is influenced by factors selected from the group consisting of:

position of the element in a printing-medium advance sequence; and number of a pass in which the element is to be fired.

12. The method of claim 10, wherein:

any element initially rejected by virtue of the applied selection probability is shifted to the bottom of the stack in rotation;

whereby it is possible for an initially rejected element to later rotate to the top of a stack for reconsideration.

13. The method of claim 10, further comprising:

determining when an individual printing element is nonfunctional;

assigning to that element a relatively low numerical weight; and applying to a corresponding value in a printmask stack a relatively low selection probability.

14. The method of claim 8, further comprising:

modifying the printmask to reflect firing-frequency limitations.

15. The method of claim 14, wherein:

the firing-frequency limitations carry a higher authority level than the numerical weights.

16. The method of claim 15, wherein:

the firing-frequency limitations are substantially absolute.

17. The method of claim 8, wherein the establishing step is selected from the group consisting of:

generating the mask on the fly for each image;

generating the mask at printer initialization; and storing the mask in nonvolatile memory for retrieval whenever needed.

18. The method of claim 17, wherein:

whenever the printer is to print, the mask is generated or retrieved for use and then, before use, is processed by stack rotation at substantially each position.

19. Apparatus for use in incremental printing of an image; said apparatus comprising:

means defining a printmask in the form of a matrix of stacks of corresponding entries for positions in the printmask;

means for rotating each stack if desired to individually select an entry for substantially each position in the printmask, respectively; and means for printing the image using selected entries.

20. A printmasking method for use in incremental printing; said method comprising the steps of:

establishing a printmask;

establishing a matrix of stacks of corresponding backup entries for values in the printmask;

determining when an individual value in the printmask is nonfunctional; and individually replacing exclusively the individual determined nonfunctional value with exclusively a corresponding individual backup entry from a corresponding stack in the matrix.

21. The method of claim 20, wherein:

the determining step determines that plural values in the printmask are nonfunctional; and the replacing step replaces those individual determined values with plural corresponding individual backup entries from plural corresponding stacks, respectively.

22. The method of claim 20, wherein:

the replacing step comprises rotating entries in the stack for selection.

23. The method of claim 20, for use with multiple individual printing elements; wherein the replacing step comprises:

associating a respective individual printing element with each entry in the stack; and identifying with the associated printing element a respective numerical weight; and applying to each entry in the stack a selection probability related to the identified numerical weight.

24. A printmasking method for use in incremental printing; said method comprising the steps of:

establishing a seminal printmask;

tiling the established seminal printmask, to create a larger printmask having closely related properties;

forming a less-regular printmask by injecting noise into the larger printmask to disrupt regularity arising in the tiling step; and using the less-regular printmask in incremental printing of an image.

25. The method of claim 24, wherein:

the using step comprises printing in a particular number of passes over some portion of the image; and the establishing step comprises preparation of a mask that is approximately cubical, each side thereof being a number of pixels or layers approximately equal to the particular number of passes.

26. The method of claim 25, wherein:

said mask preparation comprises forming a matrix of stacks of possible choices of pass number, each of said choices having an associated desired probability of use;

the using step comprises probabilistically evaluating each choice at a top of a stack, each choice being subject to rejection through said evaluating; and the using step further comprises, if a choice in a certain stack is rejected, rotating the certain stack in a particular direction to bring a different choice to the top of the certain stack.

27. The method of claim 26, wherein the noise-injecting step comprises:

rotating selected stacks in the larger printmask.

28. The method of claim 27, wherein:

rotation of a certain stack in said particular direction, starting from the position of the certain stack in the seminal printmask, tends to introduce greater randomness.

29. The method of claim 28, wherein the selected-stack rotating step comprises:

rotating at least some selected stacks in a direction opposite to said particular direction;

whereby the noise-injecting step tends to reduce randomness.

30. The method of claim 29, wherein:

said particular direction is upward, and said opposite direction is downward.

31. The method of claim 24, for use with plural printheads; and wherein:

the establishing step comprises defining a respective seminal printmask for each of the plural printheads;

the tiling step comprises tiling each respective seminal printmask to make a respective larger printmask for each of the plural printheads; and the noise-injecting step comprises inserting noise into each said respective larger printmask.

32. The method of claim 31, wherein the noise-inserting comprises:

inserting substantially identical noise into each said respective larger printmask.

33. The method of claim 31, wherein the respective-printmask defining comprises:

replicating a single seminal printmask to form a respective seminal printmask for each of the plural printheads; and modifying each respective seminal printmask to accommodate respective requirements of its printhead.

34. The method of claim 33, wherein said modifying comprises:

translating or rotating the respective seminal mask to allow for relative misalignments of the plural printheads.

35. The method of claim 24, further comprising, before the using step, application of modifications to the less-regular printmask based on at least one consideration selected from the group consisting of:

nozzle weighting;

firing-frequency limitations; and parity.

36. The method of claim 24, wherein:

the using step comprises printing in a particular number of passes over some portion of the image; and the establishing step comprises preparation of a mask that is three-dimensional;

said mask preparation comprises forming a matrix of stacks of possible choices of pass number, each of said choices having an associated desired probability of use;

the using step comprises probabilistically evaluating each choice at a specified level in a stack, each choice being subject to rejection through said evaluating; and the using step further comprises, if a choice at the specified level in a certain stack is rejected, shifting entries in the certain stack to bring a different choice to the specified level of the certain stack.

37. The method of claim 36, wherein the shifting comprises:

displacing one entry in the stack in a particular direction and by a plural number of levels; and shifting at least some remaining entries in the stack to maintain the stack.

38. The method of claim 37, wherein the displacing comprises a displacement selected from these alternatives:

moving the one entry from the specified level to a different level; and moving the one entry to the specified level from a different level.

39. The method of claim 36, wherein:

the specified level is the top or bottom of the stack.

* * * * *